United States Patent [19]

Beckmann et al.

[11] 4,361,625

[45] Nov. 30, 1982

[54] PLASTICIZER-CONTAINING FILMS OF PARTIALLY ACETALIZED POLYVINYL ALCOHOLS

[75] Inventors: Rolf Beckmann, Siegburg; Wilhelm Knackstedt, Hennef, both of Fed. Rep. of Germany

[73] Assignee: Dynamit Nobel Aktiengesellschaft, Troisdorf, Fed. Rep. of Germany

[21] Appl. No.: 37,771

[22] Filed: May 10, 1979

[30] Foreign Application Priority Data

May 12, 1978 [DE] Fed. Rep. of Germany ....... 2820780

[51] Int. Cl.³ .................... B32B 27/36; B32B 17/10
[52] U.S. Cl. ................................ 428/412; 428/437; 428/524; 428/501; 525/51; 525/56
[58] Field of Search .................... 260/30.6 R; 525/51, 525/56; 428/437, 412, 524, 501

[56] References Cited

U.S. PATENT DOCUMENTS

| | | | |
|---|---|---|---|
| 2,222,490 | 11/1940 | Robertson | 260/30.6 R |
| 2,290,193 | 1/1942 | Kirkpatrick | 260/30.6 R |
| 3,841,955 | 10/1974 | Coaker et al. | 260/30.6 R |
| 4,144,376 | 3/1979 | Beckmann et al. | 260/30.6 R |

*Primary Examiner*—George F. Lesmes
*Assistant Examiner*—E. Rollins Buffalow
*Attorney, Agent, or Firm*—Craig and Antonelli

[57] ABSTRACT

A plasticizer-containing film of a partially acetalized polyvinyl alcohol resin contains as the plasticizer a mixture of an ester of an organic cyclic acid and/or a conventional acetal plasticizer for said resin, and an ester of an oxygen acid of phosphorus.

9 Claims, No Drawings

PLASTICIZER-CONTAINING FILMS OF PARTIALLY ACETALIZED POLYVINYL ALCOHOLS

The present invention relates to plasticizer-containing films of partially acetalized polyvinyl alcohols utilized as adhesive films in the formation of composite safety glass products. In particular, the present invention relates to novel polyvinyl butyral films and the composite safety glass products which can be manufactured therefrom.

Composite safety glass generally consists of two silicate glass panes and an adhesive film joining the glass panes together. Optionally, one of the silicate glass panes can be replaced by a synthetic resin plate. Such composite safety panes are primarily employed as windshields in vehicles, particularly automotive vehicles; however, they can also be employed in the construction field, and in this connection it is also possible to bond more than two silicate or synthetic resin panes together by means of adhesive films. Such multiple composites serve, for example, as composite bulletproof glass.

Plasticized, partially acetalized polyvinyl alcohol films serve primarily as adhesive films in these composite glass products. The partially acetalized polyvinyl alcohols required for the production thereof are made by the saponification of polyvinyl acetate and subsequent acetalization with aliphatic aldehydes, e.g. formaldehyde, acetaldehyde, butyraldehyde, and other aldehydes of 3–10 carbon atoms. The saponification is generally incomplete, so that the polyvinyl alcohols in most cases still contain 0.5–5% by weight of acetyl groups, calculated as vinyl acetate groups. Also the acetalization is generally allowed to remain incomplete, so that the partially acetalized polyvinyl alcohol used for the manufacture of the films contains in most cases still free OH-groups; in case of the partially butyralized polyvinyl alcohol (denoted by PVB in the following description), this OH-content can range between 10% and 27% by weight calculated as the vinyl alcohol. In the present invention, all of these resins are to be covered by the term "partially acetalized polyvinyl alcohols."

In the production of composite safety glass, these partially acetalized polyvinyl alcohols are used as films with a specific plasticizer content. The type and quantity of plasticizer employed affect the properties of the composite safety glass. Under practical conditions, it has thus been found that an especially shatterproof composite safety glass is to have a PVB film as the intermediate film, with a plasticizer content of 15–39% by weight, preferably 25–31% by weight, and with a content of free OH-groups of 10–25% by weight, preferably 16–23% by weight, based on the plasticizerfree PVB resin. The moisture content of such a PVB film is to range between 0.2% and 0.9% by weight.

A widely used plasticizer for such PVB films is the triethylene glycol ester of 2-ethylbutyric acid. The use of dibutyl sebacate, dibutoxyethyl adipate, and dioctyl phthalate has been disclosed.

The requirements to be met by composite safety glass panes are very high. With a temperature range of −20° to +40° C., the requirements, in addition to a satisfactory adhesion of the glass to the adhesive film, are inter alia also a high penetration resistance of the composite safety glass panes. For this reason, the adhesive film must possess the required tensile strength and tensile elongation. Among the aforedescribed plasticizers, only the triethylene glycol ester of 2-ethylbutyric acid has yielded heretofore optimum results in this respect, although some properties still leave much to be desired.

The heretofore conventional, plasticizer-containing, partially acetalized polyvinyl alcohol films are very sensitive to moisture and very rapidly absorb moisture from the surroundings. This has the effect that moistening along the edges can occur in the composite safety glass products made therefrom, whereby the adhesion of the films at the marginal zones becomes inadequate.

A further disadvantage of the conventional, plasticizer-containing adhesive films resides in that composite glass produced therefrom with thicker layers of film possess an undesirable inherent coloring.

Another disadvantage of the known, plasticizer-containing, partially acetalized polyvinyl alcohol resins is their high apparent viscosity at extrusion temperatures. For this reason, they must be extruded into films at relatively high temperatures. These relatively high extrusion temperatures exert a high thermal load on the material, which is undesirable due to degradation processes, to be avoided for qualitative reasons.

The heretofore known adhesive films containing triethylene glycol esters of 2-ethylbutyric acid as the plasticizer are unsuitable for the production of a composite of glass with a transparent, tough-elastic synthetic resin, especially polycarbonate.

There has thus been the problem of providing adhesive films for composite safety glass products on the basis of plasticizer-containing, partially acetalized polyvinyl alcohols which exhibit a lower moisture sensitivity than the conventional adhesive films for composite safety glass; the apparent viscosity of which, at extrusion temperatures, is lower than in case of the conventional film compositions; which can be used likewise for producing composites of glass and polycarbonate; and which yet possess the good values for tensile elongation, tensile strength, and cold impact strength exhibited by the conventional adhesive films.

To solve this problem, plasticizer-containing films of partially acetalized polyvinyl alcohols have now been found which are characterized in that they contain as the plasticizer a mixture of (a) an ester of an organic cyclic acid and/or conventional acetal plasticizers; and (b) an ester of an oxygen acid of phosphorus.

It has been known that phthalic acid esters as well as phosphoric acid esters can be utilized as plasticizers for partially acetalized polyvinyl alcohols. The reason why they have not thus far been used under practical conditions in adhesive films for composite safety glass products resides in the following facts.

Phthalic acid esters can be intermixed, for example, only in amounts of up to maximally 20–25% by weight with a partially butyralized polyvinyl alcohol. The term 'percent by weight' relates in this case and in all further aualogue cases, if not otherwise indicated, to the mixture of partially acetalized polyvinyl alcohol plus plasticizer, i.e. to the entire film composition. In larger quantities, these esters bleed out, i.e. migrate from the partially acetalized polyvinyl alcohol. However, using these plasticizers in such relatively minor amounts has the result that the thus-produced films show too high a rigidity and too low a cold impact strength value so that they cannot be employed as adhesive films for composite safety glass.

It is known that phosphoric acid esters possess good compatibility with partially acetalized polyvinyl alcohols. They can be added without exudations, i.e. bleeding or migrating out from the film, in amounts of up to at least 70% by weight. Purely aromatic phosphoric acid esters, on account of the resulting film having too low a cold impact value, and purely aliphatic phosphoric acid esters, on account of the resulting film having too low a tensile strength value, cannot be utilized, respectively, by themselves for the production of adhesive films for composite safety glass.

With comparable properties, PVB films with phosphoric acid esters as the sole plasticizer exhibit an equally high apparent viscosity as PVB films with triethylene glycol di-2-ethylbutyric acid ester as the plasticizer, so that also in this respect phosphoric acid esters as the sole plasticizers cannot yield any improvements.

However, if according to this invention, the plasticizer for partially acetalized polyvinyl alcohol is formed by a mixture of an ester of an oxygen acid of phosphorus and an ester of an organic cyclic acid, wherein the latter can be partially or entirely substituted by a conventional acetal plasticizer, such as compounds as indicated at page 9 of this disclosure, then the thus-produced films have a lower moisture sensitivity. Even with a total plasticizer content of 40% by weight, these films have mechanical properties which correspond to those of conventional films with 29–30% by weight of triethylene glycol di(2-ethylbutyrate) as the plasticizer.

These film compositions then possess the desired lower apparent viscosity at extrusion temperatures. Thereby, the film manufacturer is capable of operating at substantially lower bulk temperatures in the extruder, with the workload on the machine remaining the same. It is thus possible to keep the thermal load on the film composition at a low value, so that the quality of the films of this invention is improved. This is also manifested, for example, by the fact that the composite safety glass products manufactured from films according to this invention, with very thick film layers, or with several film layers, possess a substantially lower inherent coloring than comparable safety glass products with PVB films containing triethylene glycol di(2-ethylbutyrate) as the plasticizer.

It is possible with the aid of the mixture of plasticizers of this invention to increase the proportion of esters of cyclic organic acids in the partially acetalized polyvinyl alcohol. Thus, for example, diisodecyl phthalate is compatible with PVB only to an extent of 20% by weight of the resulting mixture (PVB+plasticizer) however, when using a PVB resin with 10% by weight of trioctyl phosphate, it is possible to additionally admix to this composition 25% by weight of diisodecyl phthalate without the occurrence of bleeding. With correspondingly higher additions of trioctyl phosphate, a correspondingly larger proportion of diisodecyl phthalate is also possible in the plasticizer mixture, so that, for example, a mixture of 45% by weight of diisodecyl phthalate and 40% by weight of trioctyl phosphate, i.e. a plasticizer proportion of 85% by weight based on the weight of the composition is compatible with a PVB resin.

Surprisingly, the compatibility of the plasticizer mixtures of this invention is still good even with a partially acetalized polyvinyl alcohol of a low degree of acetalization. Thus, it is possible to mix with the plasticizer blends of this invention even partially butyralized polyvinyl alcohol resins with a polyvinyl alcohol content of 27% by weight in amounts of at least 35% by weight, without exudations; whereas the known plasticizers already bleed out in these amounts at a comparable butyralization degree of the polyvinyl alcohol. As expected, the mechanical strength values of the films increase with an increasing polyvinyl alcohol content. Furthermore, the tensile strength increases by raising the proportion of esters of cyclic organic acids in the plasticizer mixture, which is of special importance particularly in case of resins having a low polyvinyl alcohol content.

Accordingly, the partially acetalized polyvinyl alcohol resins usable in correspondence with this invention can have hydroxy group contents, calculated as the vinyl alcohol, of 5–30% by weight. Preferably, the hydroxy group content ranges between 16% and 23% by weight.

The quantity of plasticizer mixture contained in the films of this invention can amount to between 20% and 85% by weight, based on the entire weight of the film. This quantity depends on, inter alia, the degree of acetalization of the polyvinyl alcohol and on the aldehyde used for acetalization, as well as on the type of individual plasticizers employed. In general, this quantity is furthermore chosen so that the Shore hardness A of the films of this invention at 23° C. is between 100 and 1.

The ratio between the (1) ester of an oxygen acid of phosphorus and (2) the ester of a cyclic organic acid and/or the acetal plasticizer can range between 99:1 and 1:99, being primarily dependent on the amount and compatibility of the esters of the cyclic organic acids and/or the acetal plasticizers, in the partially acetalized polyvinyl alcohol. The ratio is furthermore dependent on the properties of the individual plasticizers selected and on the partially acetalized polyvinyl alcohol employed, as well as on the requirements to be met by the film composition to be prepared. The preferred ratio between (1) and (2) is between 85:15 and 15:85 percent by weight, and the more preferred ratio of these components is between 45:55 and 25:75.

In the plasticizers of the invention which are esters of organic cyclic acids, suitable for the acid component or group are aromatic mono-, di-, and tricarboxylic acids, such as, for example, benzoic acid, o-, m-, p-phthalic acid, and trimellitic acid. The acids can also be substituted, inter alia, by halogen or hydroxy groups, such as, for example, in case of hexahydrosalicylic acid. Suitable acid components are also Diels-Alder adducts of, for example, maleic acid or maleic anhydride with various dienes and their hydrogenation or epoxidation products, e.g. tetrahydro-, hexahydro-, endomethylenetetrahydro-, hexachloroendomethylenetetrahydro-, endooxohexahydro-, 4,5-epoxytetrahydrophthalic acid or -phthalic anhydride.

A suitable acid component of the esters of the oxygen acids of phosphorus can be constituted by acids of pentavalent and trivalent phosphorus, such as, for example, phosphoric acid, phosphorous acid, phosphonic acid and phosphinic acid.

The alcoholic esterification components of the organic cyclic acids and the oxygen acids of phosphorus are straight-chain or branched aliphatic alkyl, alkenyl, or alkoxyalkyl residues of 1–18 carbon atoms, which can optionally be halogen-substituted, cycloaliphatic residues, heterocycloaliphatic residues, aromatic residues with preferably one nucleus or two nuclei, as well as alkyl glycolates. In case of polybasic acids, the alcohol residues can be identical or different.

The preferred ester plasticizers of organic cyclic acids are di(2-ethylhexyl) phthalate, diisodecyl phthalate, phthalates of mixtures of aliphatic alcohols of 7–13 carbon atoms, benzyl butyl phthalate, dipropylene glycol dibenzoate, butyl phthalylbutyl glycolate.

The preferred ester plasticizers of the oxygen acids of phosphorus are tri(2-ethylhexyl) phosphate, tributoxyethyl phosphate, 2-ethylhexyl diphenyl phosphate, decyl diphenyl phosphate.

Suitable acetal plasticizers which can partially or entirely replace the esters of the cyclic acids are conventional acetals of the aliphatic or aromatic series obtained by acetalization of aldehydes of preferably 1–3 carbon atoms with aliphatic or araliphatic alcohols, for example, phenoxyethanol, glycerine, pentaenythrite. These products are likewise known per se as plasticizers for such resins.

The preferred acetal plasticizer is di(phenoxyethyl)-formal.

The films of this invention can be manufactured in any desired, conventional fashion. After mixing the components of the film composition, the thus-obtained film material is processed to the desired films. The compositions can be extruded or calendered, cast, injection-molded, spreadable, sinterable, or moldable by pressure. Scraps can be reprocessed in an excellent way and formed into films, for example, by extrusion.

The film materials can be furthermore modified by the use of suitable auxiliary agents, such as stabilizers, dyes, pigments, fillers, additives affecting adhesion and blocking, so that also correspondingly modified films form the subject of this invention.

The composite safety glass products made from the film compositions of this invention consist of at least one layer of these film compositions according to the invention. These safety glass products can be manufactured in a conventional manner with untempered, tempered, planar, curved, vapor-coated, imprinted, dyed, etched, textured silicate plate glass, which latter optionally has a wire insert, and with a colorless, colorful-transparent, colorful-opaque, imprinted film prepared according to this invention, which film optionally contains incorporated wires, wire mesh, fabrics, or other articles. The thickness of the silicate glass and of the films produced according to this invention can be chosen to be variable, depending on the purpose for which they are utilized, and the number of individual layers of the composite article can likewise be chosen at will.

As a result, the composite glass products containing the films of this invention as adhesive films can be utilized in the construction field in doors and door systems, in window and window arrangements, in railings for staircases, balconies or facades, in partitions as room dividers, balcony separating walls, or property fencing enclosures, in roof or roof components for terraces, skylight-type roofs, or greenhouses, in telephone booths or booths for computer systems, glass-enclosed cabinets, cashier's cages, jails, or in rooms endangered by explosion or implosion, in each case in the form of safety glass for protection against penetration, breakin, projectiles, fire, noise, cold, warmth, heat, optionally with alarm wires and/or heating wires.

In the vehicle field, the glass can be used for outfitting automotive vehicles, rail vehicles, ships, and airplanes with windshields, rear and side windows, doors, partitions, etc.

The film compositions of this invention are furthermore excellently suitable for the manufacture of composites with transparent, tough-elastic synthetic resins.

Of special interest is the composite combination of glass/polycarbonate, heretofore problematic due to the low stability of polycarbonate with respect to the customary plasticizers of PVB films. The production of such a composite has heretofore been impossible with the use of phthalates as plasticizer in PVB films (see U.S. Pat. No. 3,539,442). Therefore, special polymethacrylic acid ester casting resins with a soft characteristic were, heretofore, recommended for bonding polycarbonate to glass, necessitating the introduction of a new technique in the glass industry. In contrast thereto, it is possible with the film compositions of this invention to produce flawless composite glass products from silicate glass/polycarbonate, retaining the high transparency of polycarbonate, without modifying the conventional manufacturing techniques, on account of the synergistic effect of the mixture of, for example, phthalate and phosphate plasticizers. Thus, the film processor merely requires a single type of film for producing various composite systems.

In addition to polycarbonate, it is also possible to use as the transparent synthetic resin panes those made of polymethyl methacrylate, polyethylene terephthalate, hard PVC, polyamide, cellulose esters, styrene-acrylonitrile polymers, and others.

EXAMPLE 1

(Comparative Example)

On a rolling mill, 25% by weight and 35% by weight of diisooctyl phthalate based on the weight of resin composition, respectively, were intermixed with a commercially available, partially butyralized polyvinyl alcohol resin having a hydroxy group content of 20.7% by weight, calculated as the vinyl alcohol. The thus-obtained rolled sheets were tested visually for exudation of intermixed plasticizer. Furthermore, several films were produced in a press from the rolled sheet. Over a period of 48 hours, thin, absorbent paper was placed between two such films without exertion of pressure at room temperature and at a relative atmospheric humidity of 50–65%. The appearance of the paper was subsequently examined.

The films containing 25% by weight of diisoctyl phthalate did not show any exudation of plasticizer; whereas the plasticizer bled out from films with 35% by weight of diisoctyl phthalate.

The films having a plasticizer content of 25% by weight were tested for tensile elongation, tear strength, and cold impact strength. The determination of the cold impact strength value took place according to the method VDCh 22-02 [VDCh=Association of German Chemists] on shoulder samples (with a profile S 3 according to DIN [German Industrial Standard] 53 504) by seeking the lowest temperature at which at most one of six samples, bent into a loop, is fractured by a 200 g. falling hammer from a falling height of 200 mm. The following values were obtained:

Tear strength: 359 kp./cm$^2$
Tensile elongation: 218%
Cold impact value: $-30°$ C.

EXAMPLE 2

(Comparative Example)

In the same way as described in Example 1, various amounts of trioctyl phosphate and octyl diphenyl phosphate and cresyl diphenyl phosphate, respectively, were intermixed with a PVB resin having a hydroxy group content of 20.7% by weight, and films having a thickness of 0.76 mm. were manufactured. The plasticizer did not exude from any of the films.

Analogously Example 1, the films were tested for tensile elongation, tear strength, and cold impact value. The thus-obtained data can be seen from the following Table 1:

TABLE 1

| Type of Plasticizer | Amount (% by weight) | Tear Strength (kp/cm$^2$) | Tensile Elongation % | Cold Impact Value (°C.) |
|---|---|---|---|---|
| Trioctyl phosphate | 25 | 293 | 215 | −50 |
| Trioctyl phosphate | 30 | 254 | 235 | −50 |
| Trioctyl phosphate | 50 | 85 | 483 | −55 |
| Trioctyl phosphate | 70 | 10 | 1048 | <−55 |
| Octyl diphenyl phosphate | 35 | 205 | 285 | −45 |
| Octyl diphenyl phosphate | 50 | 60 | 538 | −50 |
| Octyl diphenyl phosphate | 70 | 15 | 952 | <−55 |
| Cresyl diphenyl phsophate | 35 | 248 | 265 | −25 |
| Cresyl diphenyl phosphate | 50 | 113 | 380 | −25 |
| Cresyl diphenyl phosphate | 70 | 41 | 552 | −40 |

In comparison to the above, another PVB film having a thickness of 0.76 mm and a hydroxy group content of 20.7%, by weight (calculated as vinyl alcohol) with 30% by weight of triethylene glycol ester of 2-ethylbutyric acid, corresponding approximately to commercially available films, was measured:

Tear strength: 275 kp./cm$^2$
Tensile elongation: 297%
Cold impact value: −50° C.

EXAMPLE 3

A commercially available PVB resin (identical to the resin used in Example 1 and Example 2) having a hydroxy group content of 20.7% by weight (calculated as the vinyl alcohol) was mixed on a rolling mill with various amounts of diisodecyl phthalate (DIDP) and trioctyl phosphate (TOF). From the thus-obtained rolled sheets, films were pressed having a thickness of 0.76 mm., the mechanical properties of which can be seen from the following Table 2. The properties were determined in the manner indicated in Examples 1 and 2.

TABLE 2

| Plasticizer Content (% by weight) | | | Tear Strength (kp/cm$^2$) | Tensile Elongation (%) | Cold Impact Value (°C.) |
|---|---|---|---|---|---|
| DIDP | TOF | Total | | | |
| 22.5 | 7.5 | 30 | 320 | 245 | −45 |
| 17.5 | 17.5 | 35 | 249 | 283 | −50 |
| 25 | 10 | 35 | 260 | 285 | −50 |
| 27.5 | 12.5 | 40 | 228 | 313 | −50 |
| 30 | 15 | 45 | 168 | 322 | −50 |
| 32.5 | 17.5 | 50 | 143 | 320 | −55 |

Samples of all films were furthermore processed into composite safety glass by placing a film between two silicate glass panes and then effecting the bond by heating to 130°–150° C. under a pressure of 12 bar. The thus-obtained composite glass panes were tested for adhesion between the silicate glass and the PVB film by means of the pummel adhesion value as described, for example, in German Pat. No. 2,410,153 and U.S. Pat. No. 4,144,376. All thus-obtained composite glass products showed pummel adhesion values of 10.

There was no exudation of the plasticizer from the films in any case. The series of film recipes listed in Table 2 can be continued with increasing plasticizer contents without exudation in the following form:

| % by Weight DIDP | % by Weight TOF | % by Weight Total Plasticizer |
|---|---|---|
| 32.5 | 22.5 | 55 |
| 35 | 25 | 60 |
| 35 | 30 | 65 |
| 37.5 | 32.5 | 70 |
| 40 | 35 | 75 |
| 42.5 | 37.5 | 80 |
| 45 | 40 | 85 |

EXAMPLE 4

Analogously to Example 3, PVB films were produced having a hydroxy group content of 20.7% by weight with varying contents of dioctyl phthalate (DOP) and trioctyl phosphate, and the mechanical data were determined. The results can be seen from Table 3. In all cases, the high plasticizer contents were compatible with the PVB resin.

TABLE 3

| Plasticizer Content (% by Weight) | | | Tear Strength (kp/cm$^2$) | Tensile Elongation (%) | Cold Impact Value (°C.) |
|---|---|---|---|---|---|
| DOP | TOF | Total | | | |
| 22.5 | 7.5 | 30 | 279 | 270 | −45 |
| 27.5 | 2.5 | 30 | 332 | 258 | −50 |
| 17.5 | 17.5 | 35 | 232 | 278 | −50 |
| 30.0 | 5.0 | 35 | 279 | 285 | −50 |
| 30.0 | 10.0 | 40 | 213 | 323 | −50 |

Samples of all films were furthermore processed into composite safety glass, by placing a film between two silicate glass panes and then establishing the bond by heating to 130°–150° C. under a pressure of 12 bar. All of the thus-obtained composite glass products showed pummel adhesion values of 10.

EXAMPLES 5–10

Analogously to Example 3, PVB films having a hydroxy group content of 20.7% by weight were produced with mixtures of various plasticizers. The plasticizers are listed in Table 4. All plasticizer mixtures were compatible with the PVB resin. The properties of the thus-obtained films can be seen from Table 4.

TABLE 4

| | Example No. | | | | | |
|---|---|---|---|---|---|---|
| | 5 | 6 | 7 | 8 | 9 | 10 |
| | (% by weight) | | | | | |
| PVB Resin | 65 | 65 | 65 | 65 | 65 | 65 |
| Dipropylene glycol dibenzoate | 17.5 | | | | | |
| Diisodecyl phthalate | | | 17.5 | 17.5 | 17.5 | 17.5 |
| Di(phenoxyethyl)formal | | 17.5 | | | | |
| Trioctyl phosphate | 17.5 | 17.5 | | | | |

TABLE 4-continued

| | Example No. | | | | |
|---|---|---|---|---|---|
| | 5 | 6 | 7 | 8 | 9 | 10 |
| | (% by weight) | | | | | |
| Tributoxyethyl phosphate | | | 17.5 | | | |
| Octyl diphenyl phosphate | | | | 17.5 | | |
| Decyl diphenyl phosphate | | | | | 17.5 | |
| Cresyl diphenyl phosphate | | | | | | 17.5 |
| Tear strength (kp/cm²) | 232 | 191 | 212 | 256 | 268 | 255 |
| Tensile elongation (%) | 312 | 308 | 358 | 284 | 295 | 265 |
| Cold impact value (°C.) | −50 | −50 | −50 | −35 | −35 | −30 |

Furthermore, composite glass panes were produced from the thus-obtained films, by placing respectively one film between two silicate glass panes and establishing the bond at a temperature of 135° C. and under a pressure of 12 bar. All films yielded a pummel adhesion value of 10.

EXAMPLE 11

Rolled sheets were produced analogously to Examples 2 and 3 from diisodecyl phthalate (DIDP) and dioctyl phthalate (DOP) or trioctyl phosphate (TOF) and a PVB resin having a hydroxy group content of 20.7% by weight (calculated as the vinyl alcohol). The apparent viscosity was measured on these rolled sheets in a capillary viscometer at 483° K. and a shear stress of 0.14 MPa (mega Pascal). The results can be seen from Table 5.

TABLE 5

| Plasticizer Content (% by weight) | | | | Apparent Viscosity |
|---|---|---|---|---|
| DIDP | DOP | TOF | Total | Pa · sec. |
| — | — | 30 | 30 | 208 |
| — | 17.5 | 17.5 | 35 | 122 |
| 17.5 | — | 17.5 | 35 | 126 |
| 25 | — | 10 | 35 | 135 |
| — | 25 | 15 | 40 | 59 |
| — | 30 | 10 | 40 | 65 |
| 22.5 | — | 17.5 | 40 | 57 |
| 27.5 | — | 12.5 | 40 | 62 |

An apparent viscosity of 223 Pa.sec. was measured for a corresponding film with 30% by weight of triethylene glycol ester of 2-ethylbutyric acid as the plasticizer.

EXAMPLE 12

Various PVB resins having differing hydroxy group contents (PVA content) were processed into films analogously to Example 3 with varying amounts of diisodecyl phthalate (DIDP) and trioctyl phosphate (TOF), and the mechanical values were determined. The results can be seen from Table 6. In all cases, the high plasticizer contents were compatible with the PVB resin.

TABLE 6

| PVA Content (% by weight) of PVB resin | Plasticizer Content (% by weight) | | | Tear Strength (kp/cm²) | Tensile Elongation (%) |
|---|---|---|---|---|---|
| | DIDP | TOF | Total | | |
| 18.4 | 17.5 | 17.5 | 35 | 153 | 346 |
| | 25 | 10 | 35 | 200 | 312 |
| | 27.5 | 7.5 | 35 | 223 | 324 |
| | 27.5 | 12.5 | 40 | 143 | 385 |
| | 30 | 10 | 40 | 159 | 379 |

TABLE 6-continued

| PVA Content (% by weight) of PVB resin | Plasticizer Content (% by weight) | | | Tear Strength (kp/cm²) | Tensile Elongation (%) |
|---|---|---|---|---|---|
| | DIDP | TOF | Total | | |
| 22.3 | 17.5 | 17.5 | 35 | 233 | 262 |
| 26.8 | 17.5 | 17.5 | 35 | 256 | 302 |

These three PVB resins were moreover processed into films with 30% by weight of triethylene glycol ester of 2-ethylbutyric acid as the plasticizer. Exudation of this plasticizer was observed in a PVB resin with 26.8% by weight of polyvinyl alcohol content.

EXAMPLE 13

Analogously to Example 12, the two PVB resins with 22.3% and 26.8% by weight of polyvinyl alcohol content, respectively, were processed into films with 40%, 45% and 50% by weight of a plasticizer mixture consisting of diisodecyl phthalate (DIDP) and trioctyl phosphate (TOF), in order to test plasticizer compatibility. The results can be seen from Table 7.

TABLE 7

| PVB resin with PVA Content of (% by weight) | Plasticizer Content (% by weight) | | | Exudation |
|---|---|---|---|---|
| | DIDP | TOF | Total | |
| 22.3 | 20 | 20 | 40 | No |
| | 22.5 | 22.5 | 45 | No |
| | 25 | 25 | 50 | No |
| 26.8 | 20 | 20 | 40 | No |
| | 22.5 | 22.5 | 45 | No |
| | 22.5 | 27.5 | 50 | No |

EXAMPLE 14

Various composites were produced having the following layer structure: silicate glass (thickness 3 mm.)+PVB film (thickness 0.38 mm.)+transparent synthetic resin (thickness 3 mm.), wherein the PVB film employed was (a) One with 30% by weight of triethylene glycol ester of 2-ethylbutyric acid as the plasticizer, and (b) one with 35% by weight of diisodecyl phthalate+trioctyl phosphate (ratio 1:1) as the plasticizer. The transparent synthetic resin was polymethyl methacrylate (Plexiglass ® of Röhm Gurgh) or polycarbonate (Makrolon ® of Bayer Ag or Lexan ® of General Electric) or polyamide Trogamid ® of Dynamit Nobel Ag. The composites were produced with the aid of a protective cover glass pane on the side of the transparent synthetic resin in a rubber bag, which was placed under a vacuum for venting and then introduced into an autoclave at 140° C. and 12 bar for a period of 1.5 hours.

All composites with the film containing diisodecyl phthalate and trioctyl phosphate as the plasticizer showed a very good adhesion to the transparent synthetic resin and were free of flaws and cloudiness. After 5 months of storage in a climate of 95% relative atmospheric humidity at 50° C., no flaws had occurred in these composites, not even in the marginal zones thereof.

In contrast thereto, the composites with a film containing the triethylene glycol ester showed, in case of the polymethyl methacrylate, only a moderately good adhesion and, in case of the polycarbonate, extensive clouding. The composite with polyamide showed a very good adhesion, was free of flaws, and exhibited no cloudiness. In the storage test at 95% relative atmospheric humidity and 50° C., however, a troublesome cloudiness already developed after 10 days, due to water absorption of the PVB film.

As a supplement to these tests, composites were produced from silicate glass+PVB film (thickness 3 mm.) and polycarbonate. A PVB film employed was one with 55% by weight of diisodecyl phthalate+trioctyl phosphate (ratio 1.45:1) as the plasticizer. The composite was again produced with a cover glass pane, but without a vacuum rubber bag, by passing the sandwich consisting of silicate glass+PVB film+polycarbonate+cover glass pane at about 50° C. through a pair of rubber rolls and then subjecting the product to an autoclave step taking place in this case, due to the softness of the film, under the conditions of 120° C., 12 bar, and 45 minutes. The thus-obtained composite was completely flawless respective to e.g. haze and adhesion.

What is claimed is:

1. A composite safety glass product which comprises a sheet of transparent silicate glass adhesively bonded to a sheet of material comprising a transparent silicate glass or a transparent synthetic resin, said sheets being bonded by a film of a partially butyralized polyvinyl alcohol resin having a hydroxy group content of 5–30% by weight calculated as the polyvinyl alcohol, and containing as a plasticizer
   (a) an ester of an organic cyclic acid selected from the group consisting of di(2-ethylhexyl)phthalate, diisodecylphthalate, a phthalate of a mixture of aliphatic alcohols of 7–13 carbon atoms, benzylbutyl phthalate, dipropylene glycol dibenzoate and butyl phthalylbutyl glycolate, and
   (b) an ester of an oxygen acid of phosphorus selected from the group consisting of tri(2-ethylhexyl)phosphate, tributyoxyethyl phosphate, 2-ethylhexyldiphenyl phosphate and decyldiphenyl phosphate, and said film containing the plasticizer in amounts of 20–85% by weight, based on the total weight of the film.

2. The composite safety glass product according to claim 1, wherein the synthetic resin is a polycarbonate.

3. The composite safety glass product according to claim 1, wherein the synthetic resin is selected from the group consisting of polymethyl methacrylate, polyethylene terephthalate, hard PVC, polyamide, cellulose esters and styrene-acrylonitrile polymers.

4. The composite safety glass product according to claim 1, wherein one of the mixture components of the plasticizer mixture is contained in the mixture in proportions of at least 1% by weight, based on the weight of the plasticizer mixture.

5. The composite safety glass product according to claim 1, wherein the partially acetalized polyvinyl alcohol has a hydroxyl group content of 16–23% by weight, calculated at the polyvinyl alcohol.

6. The composite safety glass product according to claim 1, wherein the film contains the plasticizer mixture in amounts of 30–50% by weight, based on the total weight of the film.

7. The composite safety glass product according to claim 1, wherein the film has a Shore hardness A at 23° C. of between 100 and 1.

8. The composite safety glass product according to claim 1, wherein the film has a Shore hardness A at 23° C. of between 90 and 20.

9. The composite safety glass product according to claim 1, wherein the ratio of the ester of an oxygen acid of phosphorous and the ester of a cyclic organic acid being in a range of between 85:15 and 15:85% by weight.

* * * * *